(12) United States Patent
Iso

(10) Patent No.: US 6,686,025 B2
(45) Date of Patent: Feb. 3, 2004

(54) MAGNETIC RECORDING MEDIUM

(75) Inventor: Akira Iso, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/244,058

(22) Filed: Sep. 13, 2002

(65) Prior Publication Data

US 2003/0049492 A1 Mar. 13, 2003

(30) Foreign Application Priority Data

Sep. 13, 2001 (JP) ........................................ 2001-278279

(51) Int. Cl.$^7$ ................................................. G11B 5/82
(52) U.S. Cl. ...................... 428/157; 428/163; 428/167; 428/65.3; 428/65.4; 428/65.5; 428/66.7; 428/694 SG; 360/134; 360/135
(58) Field of Search ............................... 428/64.1, 64.2, 428/65.3, 66.7, 694 SG, 157, 163, 167, 65.5; 360/134, 135

(56) References Cited

U.S. PATENT DOCUMENTS

| | | | | |
|---|---|---|---|---|
| 2,857,476 A | * | 10/1958 | Kleiber ..................... 179/100.2 |
| 3,502,761 A | * | 3/1970 | Dimitracopoulos ......... 264/163 |
| 3,834,972 A | * | 9/1974 | Sava ........................... 156/517 |
| 3,846,843 A | * | 11/1974 | Franer ......................... 360/135 |
| 3,873,994 A | * | 3/1975 | Sawazaki et al. ........ 360/130.2 |
| 3,893,181 A | * | 7/1975 | Desourdis .................... 360/84 |
| 5,777,832 A | * | 7/1998 | Yi et al. ...................... 360/135 |
| 5,935,674 A | * | 8/1999 | Saito et al. ................ 428/65.3 |

FOREIGN PATENT DOCUMENTS

| JP | 3-137821 | 6/1991 |
|---|---|---|
| JP | 4-143920 | 5/1992 |

* cited by examiner

Primary Examiner—Stevan A. Resan
(74) Attorney, Agent, or Firm—Rossi & Associates

(57) ABSTRACT

A magnetic recording medium that does not develop film swelling when exposed to severe conditions has a nonmagnetic substrate having a trench formed in the area within 2 mm from and concentrically with the outer circumference or the inner circumference of the nonmagnetic substrate, or formed outside the data area concentrically with the outer circumference or the inner circumference of the nonmagnetic substrate.

11 Claims, 1 Drawing Sheet

MAGNETIC RECORDING MEDIUM

BACKGROUND

Recently, the magnetic recording media mounted on various magnetic storage apparatuses, such external storages of a computer, are expected to exhibit a high recording capacity. For meeting the demands for high recording capacity, it has been required for the magnetic recording medium to reliably exhibit a high recording density and for the magnetic head to reliably float at a low height. To meet these requirements, various compositions and structures have been proposed for the magnetic layer of the magnetic recording medium, various materials for the nonmagnetic undercoating layer, and various materials for the nonmagnetic substrate. It is desirable for the magnetic recording media for digital household appliances now under development to be inexpensive as possible.

For realizing magnetic recording media exhibiting a high recording density and compatible with a low-floating magnetic head, various compositions and structures have been proposed for the magnetic layer of the magnetic recording medium, various materials for the nonmagnetic undercoating layer, and various materials for the nonmagnetic substrate. Although aluminum and glass are the chief materials for the nonmagnetic substrate, a polymer resin substrate, the so-called plastic substrate, has been proposed recently for the nonmagnetic substrate.

Lowering the floating height of the magnetic head can fully utilize the higher recording density in the magnetic recording media, but the magnetic recording media also need to operate reliably for a long period in severe environments. It is also required for the magnetic recording media for digital household appliances now under development to operate reliably for a long period in severe environments. The conditions, under which the magnetic recording media are used, can extend from very cold −40° C. to very hot and humid 80° C. and 80% (in relative humidity). Some household appliance makers require that the magnetic recording media be working normally for five years under the conditions described above.

Tests conducted of the magnetic recording media, including the plastic substrates presently available, reveal that the media develop film swelling (a kind of film cleavage) when they are exposed to the severe conditions described above. Accordingly, there is a need to provide a magnetic recording medium, that can be used reliably for a long period without causing film swelling under severe environmental conditions. There is also a need for a method of manufacturing such a reliable magnetic recording medium. The present invention addresses these needs.

SUMMARY OF THE INVENTION

The present invention relates to a magnetic recording medium and a method of manufacturing such a magnetic recording medium. Specifically, the present invention relates to a magnetic recording medium that can be used as a storage of a computer and a method of manufacturing such a magnetic recording medium. The present invention also relates to a magnetic storage using the magnetic recording medium described above.

The present inventor has discovered that, with extensive and intensive investigations, inclusion of a trench at the vicinity of an edge of a nonmagnetic substrate can prevent or reduce film swelling caused by exposure to severe environmental conditions.

One aspect of the present invention is a magnetic recording medium that has a nonmagnetic substrate, a nonmagnetic undercoating layer on the nonmagnetic substrate, a magnetic layer on the nonmagnetic undercoating layer, a protection layer on the magnetic layer, and a liquid lubricant layer on the protection layer. The nonmagnetic substrate can be made of a plastic resin and can have a trench or channel in the vicinity of the edge thereof. More specifically, the trench can extend along the edge of the nonmagnetic substrate.

Another aspect of the present invention is a method of manufacturing the above described magnetic recording medium. The method includes the steps of providing the plastic substrate for the nonmagnetic substrate and forming the trench along the vicinity of the edge of the plastic substrate.

Another aspect of the present invention is a magnetic storage including the above described magnetic recording medium.

The trench can have a width of 0.1 $\mu$m to 1.0 $\mu$m, such as 0.5 $\mu$m, and a depth of 100 nm or deeper. The trench can be formed in the area within 2 mm from the edge of the nonmagnetic substrate. Moreover, the trench can be formed outside the data area of the nonmagnetic substrate.

BRIEF DESCRIPTION OF THE DRAWING

The FIGURE schematically illustrates a cross section of a magnetic recording medium according to the present invention.

DETAILED DESCRIPTION

Figure 1:
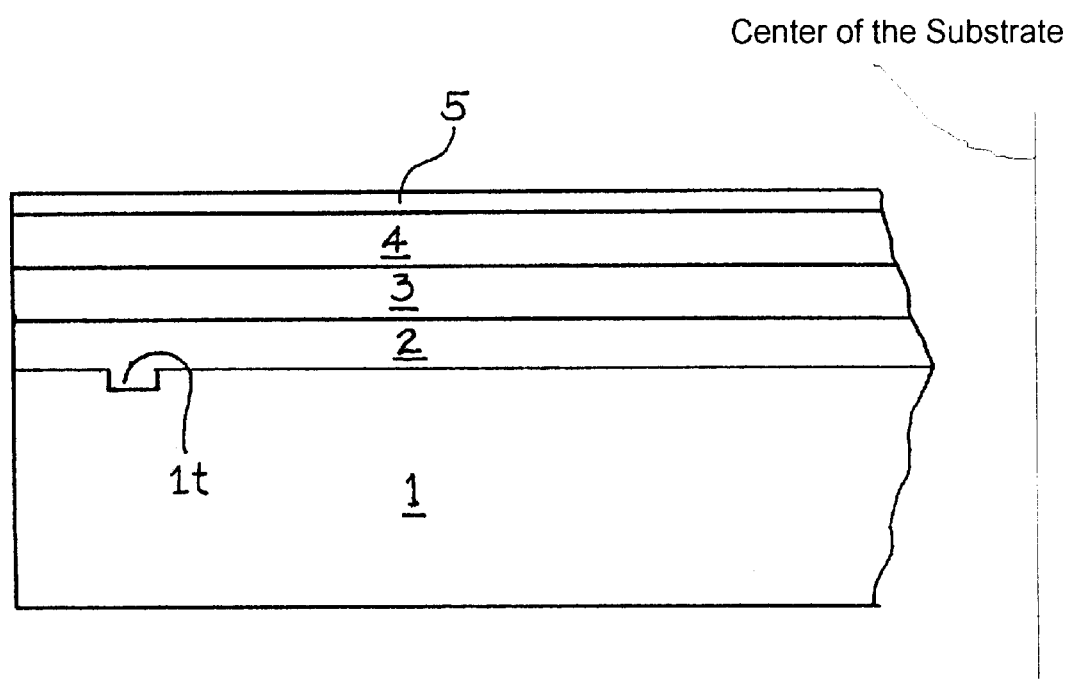

Now the invention will be described below in connection with the embodiments of circular magnetic recording media, as illustrated schematically in the FIGURE.

First, the mechanism that causes film swelling will be described. When a magnetic recording medium is left in a high temperature and high humidity environment, moisture penetrates the constituent layers to the surface of the nonmagnetic substrate. If the nonmagnetic substrate is a plastic substrate (polymer resin substrate), the moisture aggregates due to the hydrophobic nature of the plastic substrate and the aggregating moisture causes film swelling. When contaminants are on the surface of the nonmagnetic substrate, the contaminants work as nuclei promoting aggregation of the moisture.

The magnetic recording medium according to the invention prevents the film swelling described above and further prevents film cleavages. The magnetic recording medium according to the invention includes a nonmagnetic substrate 1, which itself can be circular or have a circular portion, a nonmagnetic undercoating layer 2 on the nonmagnetic substrate 1, a magnetic layer 3 on the nonmagnetic undercoating layer 2, a protection layer 4 on the magnetic layer 3, and a liquid lubricant layer 5 on the protection layer 4. The nonmagnetic substrate 1 is a plastic substrate that can have a circular portion 1t debossed or channeled substantially concentrically with the outer circumference of the nonmagnetic substrate or the circular portion. The circular debossed or channel portion 1t can have a width from 0.1 $\mu$m to 1.0 $\mu$m and a depth of 100 nm or deeper.

The film swelling localizes to the channel portion 1t of the plastic substrate 1 since water coming out of the substrate and water coming in the outside localize to the trench 1t, which can be formed by debossing. Therefore, the trench 1t is formed in the vicinity of and substantially parallel to the edge of the magnetic recording medium. More in detail, the trench 1t can be formed by debossing the area within 2 mm from the outer circumference or the inner circumference of the magnetic recording medium. Preferably, the trench 1t is formed outside the data area, i.e., in the non-data area. When the trench 1t is formed near the outer circumference, the non-data area includes a sky-jump area or the area surrounding the L/UL area. When the trench is formed near the inner circumference, the non-data area includes the clump area.

Swelling of the data area can be prevented by forming at least one turn of a trench 1t, 0.5 μm in width and 100 nm or deeper in depth, near the edge of a conventional circular plastic substrate. The areas, in which swellings occur can be reduced by irradiating plasma to the substrate or by coating carboxylic acid. For the treatment by plasma irradiation, it is preferable to use Ar gas, O2 gas, or a mixture thereof. Carboxylic acid can be coated by dip coating, vapor coating, or spin coating.

Commercial products such as APL6015T supplied from Mitsui Chemicals, Inc., ZEONEX 280R supplied Nippon Zeon Co., Ltd., and ARTON supplied from JSR Corp. can be used for the nonmagnetic substrate, although other materials may be used without any problem.

A turn of or a circular channel 1t is formed substantially concentrically with the circumference of a circular nonmagnetic substrate made of any of the materials described above. For example, the nonmagnetic substrate can be formed by injection molding or by compression molding using a die. The surface thereof can be machined so that the die is suitable for forming a substrate having a trench. Alternatively, the nonmagnetic substrate can be formed by using a die having a mirror-polished inner surface and then the trench can be formed by a stamper.

A laminate, including at least the nonmagnetic undercoating layer 2, the magnetic layer 3 on the nonmagnetic undercoating layer 2, the protection layer 4 on the magnetic layer 3 and the liquid lubricant layer 5 on the protection layer 4, is formed on the nonmagnetic substrate 1, the surface thereof having been treated as described above, resulting in a magnetic recording medium. The resulting magnetic recording medium can be mounted on a magnetic storage of a data processing apparatus.

According to a first specific embodiment according to the present invention, a set of seven circular nonmagnetic plastic substrates or discs are fabricated so that each substrate has six separate circular trenches or channels 1t, each having a width of 0.5 μm, formed at the following locations (radii): 45 mm, 45.5 mm, 46 mm, 14 mm, 14.5 mm, and 15 mm, measured from the center of the substrate to the center of the trenches. The depths of the six trenches of the same plastic substrate are the same, which is one of the following trench depths for each plastic substrate: 20 nm, 25 nm, 50 nm, 75 nm, 100 nm, 125 nm, and 150 nm.

The magnetic recording media according to the first embodiment are exposed to the following conditions in attempting to develop swellings. The magnetic recording media obtained are exposed for one hour at 25° C. at 25% humidity. Then, the magnetic recording media are exposed for one hour at 80° C. at the same 25% humidity. Then, the humidity is raised to 80% and the magnetic recording media are exposed for four hours at 80° C. at 80% humidity. Then, the magnetic recording media are exposed for one hour at 80° C., while the humidity is being changed from 80% to 5% during that hour, and then the magnetic recording media are exposed for another hour at 80° C. at 5% humidity. Then, the temperature and humidity are dropped to −40° C. and 0% humidity, and the magnetic recording media are exposed for four hours at −40° C. at 0% humidity. Then, the magnetic recording media are exposed for an hour while the temperature and humidity are being changed from −40° C. to 25° C. and 0% to 5% humidity. Then, the magnetic recording media are exposed for an additional hour at 25° C. at 5% humidity. Then, the magnetic recording media are returned to the test condition, at 25° C. at 25% humidity. Then, the swellings formed in the magnetic recording media are observed under an optical microscope.

When the debossing depth is 100 nm or deeper, the swellings localize to the trenches. Except for the area between 45 mm and 46 mm in radius and the area between 14 mm and 15 mm in radius, no swelling is observed when the trench is 100 nm or deeper. Moreover, the swellings localize to the vicinity of the trenches when the trench depths are 75 nm or shallower, but some swellings are observed in the area where the radius is 45 mm or shorter. When the trench depth is 20 nm, swellings are observed in almost all the areas.

In the second specific embodiment, similar to the first embodiment, a set of seven circular nonmagnetic plastic substrates or discs are fabricated so that each substrate has four separate circular trenches or channels 1t, each having a width of 0.5 μm, formed at the following locations (radii): 45.5 mm, 46 mm, 14 mm, 14.5 mm, measured from the center of the substrate to the center of the trenches. The depths of the four trenches of the same plastic substrate are the same, which is one of the following trench depths for each plastic substrate: 20 nm, 25 nm, 50 nm, 75 nm, 100 nm, 125 nm, and 150 nm.

The magnetic recording media according to the second embodiment are exposed to the same conditions as the first embodiment in attempting to develop swellings. Then, the swellings formed in the magnetic recording media are observed under an optical microscope.

The swellings localize to the trenches when the trench depth is 50 nm or deeper, and some swellings are observed in the area where the radius thereof is 45.5 mm or shorter. When the trench depth is 20 nm, swellings are observed in almost all the areas.

The third specific embodiment according to the present invention, like the second embodiment, a set of seven circular nonmagnetic plastic substrates or discs are fabricated so that each substrate has four separate circular trenches or channels it, each having a width of 0.5 μm, formed at the following locations (radii): 45.5 mm, 46 mm, 14 mm, 14.5 mm, measured from the center of the substrate to the center of the trenches. The depths of the four trenches of the same plastic substrate are the same, which is one of the following trench depths for each plastic substrate: 20 nm, 25 nm, 50 nm, 75 nm, 100 nm, 125 nm, and 150 nm. The third embodiment thus is identical to the second embodiment, except that all the nonmagnetic plastic substrates of the third embodiment are treated with radio frequency (RF) glow discharge, at the RF power of 100 W in 100% Ar gas for 10 sec.

The magnetic recording media according to the third embodiment are exposed to the same conditions as the first and second embodiments in attempting to develop swellings. Then, the swellings formed in the magnetic recording media are observed under an optical microscope.

Swellings are observed in the vicinity of the trenches, but no swelling is observed outside the trench areas.

The present invention has been described in connection with the nonmagnetic substrate for the circular magnetic media that include at least one circular trench, with the center thereof coincides with the center of the outer circumference or the inner circumference of the circular nonmagnetic substrate. However, the present invention is applicable also to a magnetic tape and such other noncircular or rotating magnetic recording media. For example, the areas in the vicinity of the side edges of a magnetic tape can be debossed. Preferably, the areas within 2 mm from the respective side edges or the areas outside the data area extending along the traveling direction of the magnetic tape can be debossed.

As described above, a magnetic recording medium, that does not cause any swelling under severe environmental conditions, can be obtained by forming a trench in the vicinity of the edge of a plastic substrate. In detail, a magnetic recording medium, that does not cause any swelling in the data area under severe environmental conditions, such as in a very cold environment of −40° C. and a very hot and humid environment of 80° C. and 80%, can be obtained by forming a trench, from 0.1 $\mu$m to 1.0 $\mu$m in width and 100 nm or deeper in depth, such as by debossing the surface thereof.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-278279, in its entirety, including the drawings, claims, and the specification thereof, is incorporated herein by reference.

What is claimed is:

1. A magnetic recording medium comprising:
   a nonmagnetic substrate made of a plastic resin, the nonmagnetic substrate having a trench extending along the vicinity of an edge of the nonmagnetic substrate;
   a nonmagnetic undercoating layer on the nonmagnetic substrate, the non magnetic undercoating layer coating the trench;
   a magnetic layer on the nonmagnetic undercoating layer;
   a protection layer on the magnetic layer; and
   a liquid lubricant layer on the protection layer.
   wherein said medium having a substrate with said trench exhibits reduced swelling caused by absorbed moisture compared to a medium having a substrate without said trench.

2. The magnetic recording medium according to claim 1, wherein the trench is from 0.1 $\mu$m to 1.0 $\mu$m in width and 100 nm or deeper in depth.

3. The magnetic recording medium according to claim 1, wherein the trench is 0.5 $\mu$m in width and 100 nm or deeper in depth.

4. The magnetic recording medium according to claim 1, wherein the trench is in the area within 2 mm from the edge of the nonmagnetic substrate.

5. The magnetic recording medium according to claim 1, wherein the trench is outside the data area of the nonmagnetic substrate.

6. A method of manufacturing a magnetic recording medium including a nonmagnetic substrate; a nonmagnetic undercoating layer on the nonmagnetic substrate; a magnetic layer on the nonmagnetic undercoating layer; a protection layer on the magnetic layer; and a liquid lubricant layer on the protection, layer the method comprising the steps of:
   providing the nonmagnetic substrate composed of plastic;
   forming a trench extending along the vicinity of an edge of the plastic substrate; and
   forming the nonmagnetic undercoating layer on the nonmagnetic substrate, the nonmagnetic undercoating layer coating the trench.
   wherein said medium having a substrate with said trench exhibits reduced swelling caused by absorbed moisture compared to a medium having a substrate without said trench.

7. The method according to claim 6, wherein the step of forming comprises forming the trench from 0.1 $\mu$m to 1.0 $\mu$m in width and 100 nm or deeper in depth.

8. The method according to claim 6, wherein the trench is 0.5 $\mu$m in width and 100 nm or deeper in depth.

9. The method according to claim 6, wherein the step of forming comprises forming the trench in the area within 2 mm from the edge of the nonmagnetic substrate.

10. The method according to claim 6, wherein the step of forming comprises forming the trench outside the data area of the nonmagnetic substrate.

11. A magnetic storage device comprising:
    a magnetic recording medium mounted thereon, the magnetic recording medium including:
      a nonmagnetic substrate made of a plastic resin, the nonmagnetic substrate having a trench extending along the vicinity of an edge of the nonmagnetic substrate;
      a nonmagnetic undercoating layer on the nonmagnetic substrate, the non magnetic undercoating layer coating the trench;
      a magnetic layer on the nonmagnetic undercoating layer;
      a protection layer on the magnetic layer; and
      a liquid lubricant layer on the protection layer.
    wherein said medium having a substrate with said trench exhibits reduced swelling caused by absorbed moisture compared to a medium having a substrate without said trench.

* * * * *

UNITED STATES PATENT AND TRADEMARK OFFICE
CERTIFICATE OF CORRECTION

PATENT NO. : 6,686,025 B2
DATED : February 3, 2004
INVENTOR(S) : Akira Iso

It is certified that error appears in the above-identified patent and that said Letters Patent is hereby corrected as shown below:

<u>Title page, Item [54] and Column 1, line 1,</u>
Title, please change "MAGNETIC RECORDING MEDIUM" to -- MAGNETIC RECORDING MEDIUM, THE METHOD OF MANUFACTURING THE SAME, AND THE MAGNETIC STORAGE USING THE MAGNETIC RECORDING MEDIUM --

Signed and Sealed this

Twenty-seventh Day of April, 2004

JON W. DUDAS
*Acting Director of the United States Patent and Trademark Office*